United States Patent
Temme (10) Patent No.: US 6,858,282 B2
(45) Date of Patent: Feb. 22, 2005

(54) TEXTURED GRAPHITE SHEET INFUSED WITH A SEALANT

(75) Inventor: George H. Temme, Cheshire, CT (US)

(73) Assignee: Henkel Corporation, Rocky Hill, CT (US)

(*) Notice: Subject to any disclaimer, the term of this patent is extended or adjusted under 35 U.S.C. 154(b) by 0 days.

(21) Appl. No.: 10/111,627

(22) PCT Filed: Dec. 14, 2000

(86) PCT No.: PCT/US00/33810

§ 371 (c)(1),
(2), (4) Date: Apr. 26, 2002

(87) PCT Pub. No.: WO01/43960

PCT Pub. Date: Jun. 21, 2001

(65) Prior Publication Data

US 2002/0192457 A1 Dec. 19, 2002

Related U.S. Application Data

(60) Provisional application No. 60/172,132, filed on Dec. 17, 1999.

(51) Int. Cl.[7] .................................................. B32B 3/24
(52) U.S. Cl. .................... 428/131; 428/306.6; 428/408; 428/307.3; 428/320.2; 428/138; 428/139; 428/140; 428/137; 427/292; 427/385.5
(58) Field of Search .............................. 428/306.6, 408, 428/307.3, 320.2, 131, 137, 138, 139, 140; 427/292, 385.5

(56) References Cited

U.S. PATENT DOCUMENTS

| | | | |
|---|---|---|---|
| 3,701,676 A | 10/1972 | Bader et al. | 117/49 |
| 4,567,086 A | 1/1986 | Fukuda et al. | 428/166 |
| 4,687,607 A | 8/1987 | Shigeta et al. | 264/29.5 |
| 4,729,910 A | 3/1988 | Fukuda et al. | 427/294 |
| 4,752,518 A | 6/1988 | Lohrke et al. | 428/131 |
| 5,021,284 A | 6/1991 | Miwa et al. | 428/166 |
| 5,149,518 A | 9/1992 | Mercuri et al. | 423/449 |
| 5,544,703 A * | 8/1996 | Joel et al. | 165/167 |
| 5,885,728 A | 3/1999 | Mercuri et al. | 429/30 |
| 5,902,762 A | 5/1999 | Mercuri et al. | 501/99 |
| 6,506,484 B1 * | 1/2003 | Mercuri et al. | 428/304.4 |

FOREIGN PATENT DOCUMENTS

JP    403046765 A  * 2/1991

* cited by examiner

Primary Examiner—William P. Watkins, III
(74) Attorney, Agent, or Firm—Steven C. Bauman (57) ABSTRACT

A method for sealing flexible graphite sheets formed from exfoliated graphite particles is provided. A textured surface is provided onto the graphite sheet to facilitate the infusion of a sealant into the internal pores of the sheet.

25 Claims, 6 Drawing Sheets

TEXTURED GRAPHITE SHEET INFUSED WITH A SEALANT

CROSS REFERENCE TO RELATED APPLICATIONS

This application is the National Stage filing of International Patent Application No. PCT/US00/33810, Dec. 14, 2000, which claims the benefit of U.S. Provisional Application No. 60/172,132, filed Dec. 17, 1999.

FIELD OF THE INVENTION

The present invention relates to a flexible graphite sheet impregnated with a sealant. More particularly, the present invention relates to texturing a surface of the flexible graphite sheet to facilitate the infusion of the sealant into the porosity of the graphite sheet.

BACKGROUND OF RELATED TECHNOLOGY

Natural graphites are made up of layered planes of hexagonal arrays of networks of carbon atoms and typically exist in the shape of flakes in nature. These layered planes of hexagonally arranged carbon atoms are substantially flat and are oriented so as to be substantially parallel and equidistant to one another. The substantially flat, parallel equidistant layers of carbon atoms are joined together by weak Van der Waals forces. These natural graphites are soft and brittle and are typically difficult to form into a shape due to cracking along these layered planes. Such characteristics of graphites are well known to those skilled in the art, see, e.g., U.S. Pat. No. 5,149,518.

Natural graphites, however, may be formed into flexible sheets by compressing exfoliated graphite particles. Exfoliated graphite particles are formed by expanding the natural graphite flakes. In this expansion process, natural graphite flakes are intercalated by dispersing the flakes in a solution containing an oxidizing agent, for instance, a mixture of nitric and sulfuric acid. After the flakes are intercalated excess solution is drained from the flakes and after washing with water, the intercalated graphite flakes are dried. Upon exposure to high temperature, for instance 1,090–1,370° C. (2,000–2,500° F.), the particles of intercalated graphite expand in dimension as much as 80 to 1000 or more times their original volume in an accordion-like fashion in the direction perpendicular to the layered planes of the hexagonally arranged carbon atoms of the constituent graphite particles.

The exfoliated graphite particles are then compressed or compacted together, in the absence of any binder, so as to form a flexible integrated graphite sheet of desired thickness and density. The compression or compaction is carried out by passing a thick bed of expanded particles between pressure rolls or a system of multiple pressure rolls to compress the material in several stages into sheet material of desired thickness.

The sheet material formed from the exfoliated graphite particles, unlike the original graphite flakes, can be formed and cut into various shapes. The compression operation flattens the expanded graphite particles causing them to somewhat engage and interlock. The compression reorientates many of the carbon atoms from the perpendicular, accordion-like arrangement back into layered, parallel planes. Nevertheless, some carbon atoms remain in substantially nonparallel planes. These carbon atoms in the nonparallel planes increase the porosity of the sheet as compared to natural graphite having parallel planes of carbon atoms, provide engagement among parallel planes of carbon atoms to provide flexibility to the sheet, and allow mechanical shaping without substantial cracking. Furthermore, as the degree of compression increases, the degree of reorientation of carbon atoms from nonparallel planes into layered, parallel planes also increases, especially near the exterior surfaces of the sheet.

The density of the compressed exfoliated product is typically in the range of about 0.08 to 1.4 g/cc (5 to 90 lbs/ft$^3$) which is lower than the density of natural graphite (or fully compressed graphite) having a bulk density of about 2.2 g/cc (140 lbs/ft$^3$). As the density of a graphite product increases, the porosity of the graphite product typically decreases. Porosity, P, is defined as the fraction of the total volume of a porous substance that is occupied by the pores of the substance, as shown below in Formula I.

$$P = V_P/V_T, \quad (I)$$

where $V_P$ is the pore volume and $V_T$ is the total volume.

The pore volume, $V_P$, of a porous material is the total volume, $V_T$, less the volume of the fully compressed bulk material, $V_0$, or $$V_P = V_T/V_0 \quad (II)$$

The porosity of a porous substance may also be expressed in terms of densities, as shown below in Formula III.

$$P = 1 - D_P/D_0, \quad (III)$$

where $D_P$ is the density of the porous material and $D_0$ is the density of the fully compressed material.

From Formula III, the porosity of the compressed product is about 0.96 to about 0.36 for products having a density of about 0.08 and 1.4 g/cc, respectively. The porosity of a fully compressed material is zero because such a fully compressed material does not have pore volume. This above-calculated porosity is often referred to as true porosity because the volume of both open and sealed pore spaces are included. Apparent porosity is a measurement of just the open-pore space which is accessible to a fluid, such as nitrogen or mercury. The volume of such open pore space is then substituted for $V_P$ in Formula I.

A higher density or a lower porosity product is typically too stiff for use as flexible sheet graphite and is typically too mechanically weak to survive mechanical shaping processes. Some applications also require higher impermeability or greater mechanical strength than is typical for compressed graphite sheets. For instance, anode and cathode fluid-flow plates used in a fuel cell should be substantially impermeable to gaseous reactants and products, such as hydrogen and oxygen, to avoid undesired leakage of the reactants and products. For these applications, a sealant is impregnated into the graphite sheet to seal the porosity, thereby providing the sealed graphite plate with greater impermeability. A similar graphite plate without having its pores sealed with a sealant would not be sufficiently gas impermeable for use within a fuel cell.

The impregnation of a sealant into a graphite sheet is often difficult because the sealant may not readily penetrate into the internal porosity of the sheet due to layered, parallel planes of carbon atoms at the surface of the plate. These layered, parallel planes tend to block access of the internal porosity. Furthermore, as the density of the graphite sheet increases, e.g., from about 0.08 to about 1.4 g/cc (5 to 90 lbs/ft$^3$), impregnation of a sealant into internal porosity becomes more difficult because the outer surface of the plate is characterized by a greater number of layered, parallel planes of carbon atoms. Impregnation of these sheets, especially the denser sheets, is often quite time-consuming, thus increasing the manufacturing costs associated with such plates.

One technique for impregnating a flexible graphite sheet is disclosed in U.S. Pat. No. 4,729,910. The disclosed technique is to de-aerate the sheet and to apply a sealant under conditions of reduced pressure to facilitate the movement of the sealant into the porosity of the sheet. The technique suffers the disadvantage of requiring expensive pressure reducing equipment and using a sealant dissolved in organic solvents to reduce the viscosity of the sealant to permit entry of the less viscous sealant mixture into the porosity of the sheet. The organic solvent is then removed under reduced pressure conditions before the sealant is heat cured. This technique thus requires multiple pressure reducing steps to seal a graphite sheet.

U.S. Pat. Nos. 5,885,728 and 5,902,762 discloses a technique where ceramic fibers are incorporated into the graphite sheets to facilitate subsequent sealant infusion. This technique, however, suffers from the disadvantage of introducing impurities, such as the ceramic fibers themselves, which can be harmful to certain applications, such as fuel cells where the surfaces of the graphite sheets are coated or proximal to precious metals, such as platinum.

Despite these efforts, a need exists for sealing flexible graphite sheets without introducing impurities potentially harmful to the final application and without requiring multiple, complex processing steps.

SUMMARY OF THE INVENTION

The present invention relates to a method to seal flexible graphite sheets. The method of the present invention for sealing a graphite sheet having opposed planar outer surfaces defining a interior portion therebetween, the sheet being formed from exfoliated graphite particles to provide the interior with pores. The inventive method includes the steps of providing a plurality of holes extending from the interior of the sheet to at least one of its planar surfaces, wherein the holes are in fluid communication with the pores; selecting a sealant; contacting the sealant with the one planar surface having the holes, wherein the sealant communicates in fluid fashion through the holes and through the pores; and providing a free radical initiator to initiate the cure of the sealant.

Useful sealant include phenolic resins, vinyl resins, silicone resins, acrylic resins, epoxy resins and the like. (Meth) acrylic resins are particularly useful. Such sealants can be thermally or anaerobically cured by free radical mechanisms.

In one aspect of the present invention, a sheet of flexible graphite having opposed parallel, planar outer surfaces that are textured to provide holes from interior of the flexible sheet to at least one of the planar outer surfaces of the flexible graphite sheet is provided. A sealant is then contacted with the textured graphite sheet. The holes provide a passageway for the sealant to travel into the internal pores of the sheet.

Detailed Description of the Invention

Flexible graphite sheets that are formed from exfoliated graphite particles have greater internal porosity than natural graphites. Although the present invention is described as a flexible graphite sheet, other forms are suitable with the present invention. For example, exfoliated graphite particles may be suitable processed into other shapes, such as, but not limited to, a cone, a cube, a cylinder, a disk, a prism, a parallelepiped, a sphere, and the like. The internal pores resulting in this porosity are typically inaccessible because the surface layers and the constituent layers of carbon atoms below the surface are substantially parallel to the surface of the sheet. These layers block the flow of a sealant into the pores of the sheet. Sealant will, however, flow readily within the sheet in directions parallel to opposed parallel planar surfaces if the sealant can first penetrate past the parallel surface atoms.

As used herein, the phrase "flexible graphite sheets" and its variants refer to an article of manufacture formed from compression of exfoliated graphite particles without a resin.

The present invention is a flexible graphite sheet that has access for fluid communication of a sealant to these internal pores. The fluid communication permits the flow of a sealant into the porosity of the graphite sheet. The term "fluid communication" and its variants refer to, but are not limited to, fluid impregnation, fluid transmission, fluid flow, fluid permeation, and the like. Upon curing the sealant, a substantially gas impermeable graphite sheet is obtained. Such a sealed sheet is useful as an anode or cathode fuel plate in a fuel cell.

Flexible graphite sheets may be formed by an exfoliation process and are also commercially available from the UCAR Carbon Technology Corporation, located in Danbury, Conn., under the trade name Grafoil®. Flexible graphite can be made or are available in a wide range of densities. For instance, exfoliated graphite particles can be formed into flexible graphite sheets having a bulk density of about 0.08 to about 1.4 g/cc (5 to about 90 lbs/ft$_3$). Higher density materials are more difficult to impregnate with a sealant than lower density materials due to a greater alignment of the carbon atoms in the layered, parallel groups, especially at or near an outer surface of the sheet. Furthermore, graphite sheets are often subjected to additional mechanical processing, such as mechanical deformation, that increases the resulting bulk density. These processed sheets are also often difficult to seal with a sealant due to the inaccessibility of the internal pores.

The present invention provides a flexible graphite sheet that can be sealed with a curable sealant. The present invention provides for infusion of a sealant into the pores of flexible graphite sheets of varying densities. For example, flexible graphites of the present invention with low density from about 0.08 to about 0.3 g/cc (5 to 19 lbs/ft$^3$) have high internal porosity where a sealant can flow substantially throughout the interior of the sheet without undue difficulties. Higher density, flexible graphites of the present invention, such as densities greater than about 1.0 g/cc (62.4 lbs/ft$^3$) are also impregnated with a sealant without undue difficulties.

The present invention is a flexible graphite sheet formed from exfoliated graphite particles that provides access to the internal pores of the sheet. As used herein, the term "hole" and its variants refer to any opening or passage capable of providing fluid communication from an exterior surface of a shape to internal portions of the shape. Holes are placed in the sheet from the outer planar surface of the sheet to the internal portion of the sheet. Holes emanating from both opposed parallel surfaces to the internal portions of the sheet are also useful with the present invention. A method for providing a flexible graphite sheet with holes to permit access of a sealant into the internal pores of a sheet is also disclosed.

A flexible graphite sheet is textured to provide such holes. Holes are formed from one planar surface into the internal portion of a plate. Holes that are formed up to the mid-point of the sheet are useful with the present invention. The holes may have a uniform depth, i.e., up to 50% depth, or may vary in depth. The holes may be formed by a variety of mechanical methods. The holes may be pressed, milled, drilled or cut into the graphite plate. A template to texture the sheet with a plurality number of holes in one or a few mechanical steps is also useful with the present invention. The texturing of a flexible graphite sheet may be a separate mechanical process, or may be combined with thermo-mechanical processes, such as mechanical deformation, in a single mechanical step.

In one aspect, a template having a plurality of wire-like protuberances is contemplated. Any suitable diameter hole is useful with the present invention. Larger diameter holes provide quicker infusion rates of sealant into a textured sheet as compared with smaller diameter holes. The formation of the larger diameter holes, however, may result in cracking of the graphite sheet along the layered planes of carbon atoms. Holes of about 0.1 mm (0.004 inches) diameter are useful with the present invention. The holes can be placed to substantially cover the outer surface of the sheet. Holes that are placed within 0.1 mm to 1 cm (0.004 to 0.4 inches) or larger of each other are useful for providing access of a sealant into the internal pores of the graphite sheet.

The force used to make the holes is controlled to avoid excessive force that may crack the sheet. It is well within the skill of those skilled in the art to determine the appropriate force to be used to provide adequate access to internal porosity without adversely affecting the mechanical integrity of the graphite sheet.

In one aspect of the present invention, a flexible graphite plate for use as a fuel cell plate with a textured surface to permit sealant infusion is provided. The present invention, however, is not limited to fuel cell plates, but can also be used in other applications where high strength graphite or highly impermeable graphite is desirable, such as gaskets.

Figure 1:
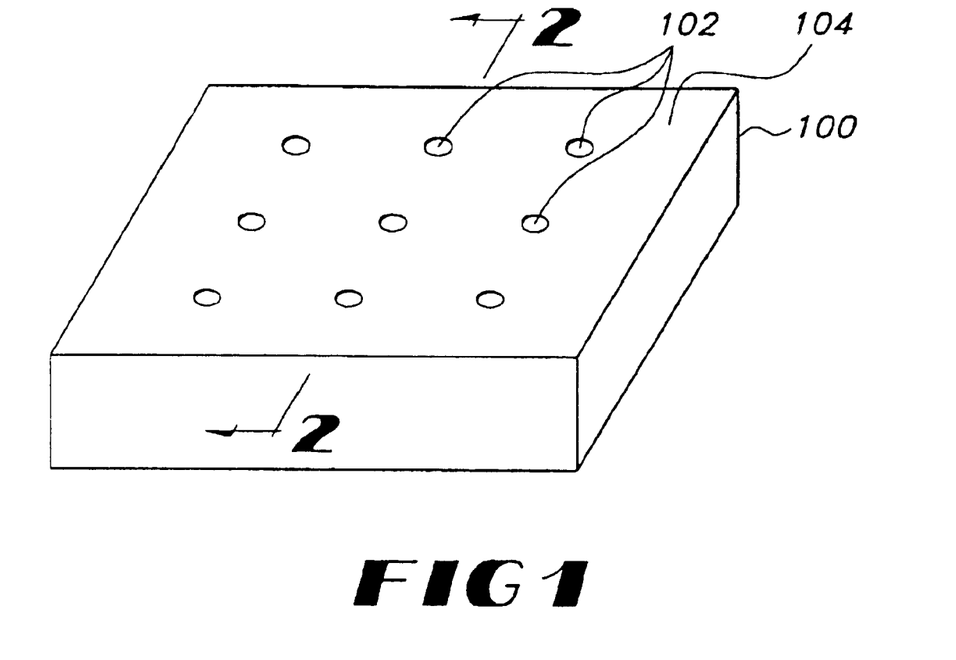
FIG. 1 is a perspective view of a textured graphite sheet of the present invention.

FIG. 1 is a perspective view of flexible graphite sheet 100 of the present invention. Flexible graphite sheet 100 has a plurality of holes 102 at an outer, planar surface 104. Holes 102 provide fluid communication of a sealant (not shown) into the pores (not shown) of flexible graphite sheet 100. Holes 102 may consist of a regular pattern of holes on the outer, planar surface 104 or may consist of a plurality of holes lacking a regular pattern.

Figure 2:
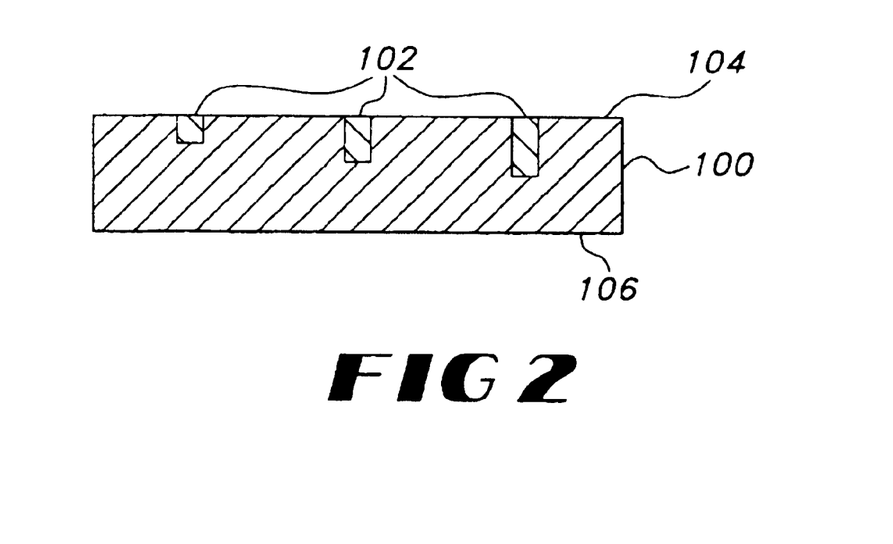
FIG. 2 is a cross-sectional view of the textured graphite sheet of FIG. 1, taken along the 2—2 axis.

FIG. 2 is a cross-sectional view of the flexible graphite sheet 100, taken along the 2—2 axis. As depicted in FIG. 2, holes 102 vary in depth to provide fluid communication to the pores (not shown) of the flexible graphite sheet 100. These pores are present throughout the internal portions of flexible graphite sheet 100. Alternatively, the holes 102 may be substantially constant in depth to provide fluid communication to the internal pores of the flexible graphite sheet 100.

Furthermore, outer, planar surface 106 that is opposed to the outer, planar surface 104 may also be textured with holes. The holes 102 are desirably formed to maximum depth of about one-half the width between the outer, planar surfaces 104 and 106.

Figure 3:
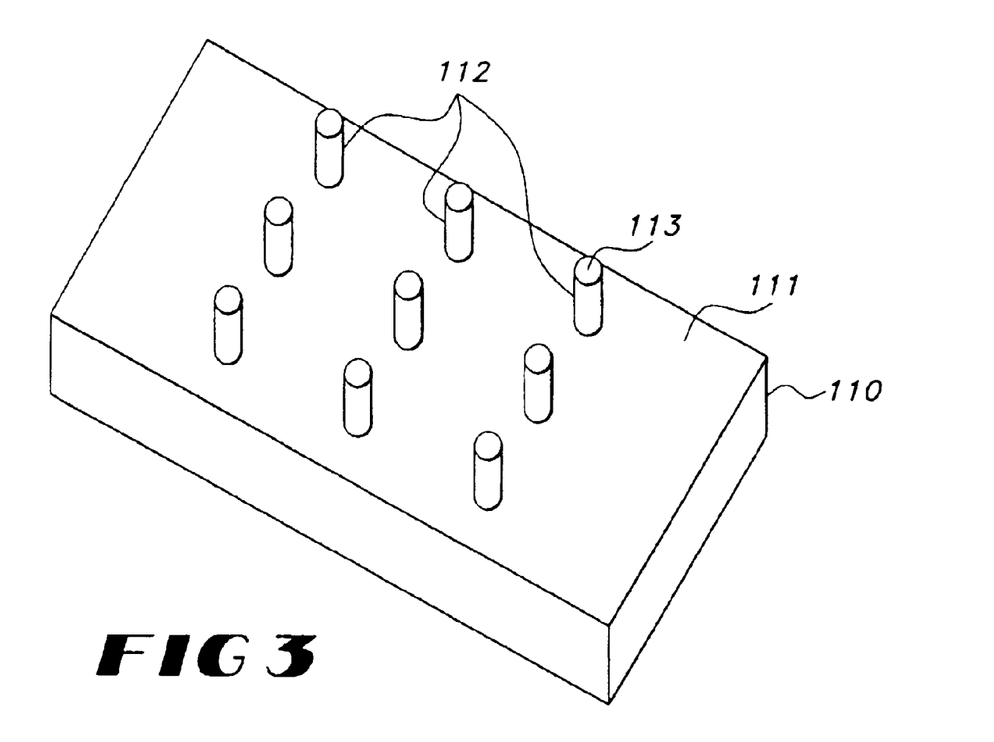
FIG. 3 is a perspective of a tool useful for texturing the flexible graphite sheet of FIG. 1.

FIG. 3 is a perspective of a tool 110 useful for forming holes 102 in the flexible graphite sheet 100. Tool 110 includes protuberances 112 extending from surface 111 of tool 110. Protuberances 112 are depicted as cylinders, but other shapes may suitably be used. For example, the distal ends 113 of protuberances 112 may be pointed to facilitate penetration of protuberances into flexible graphite sheet 100.

Figure 4:
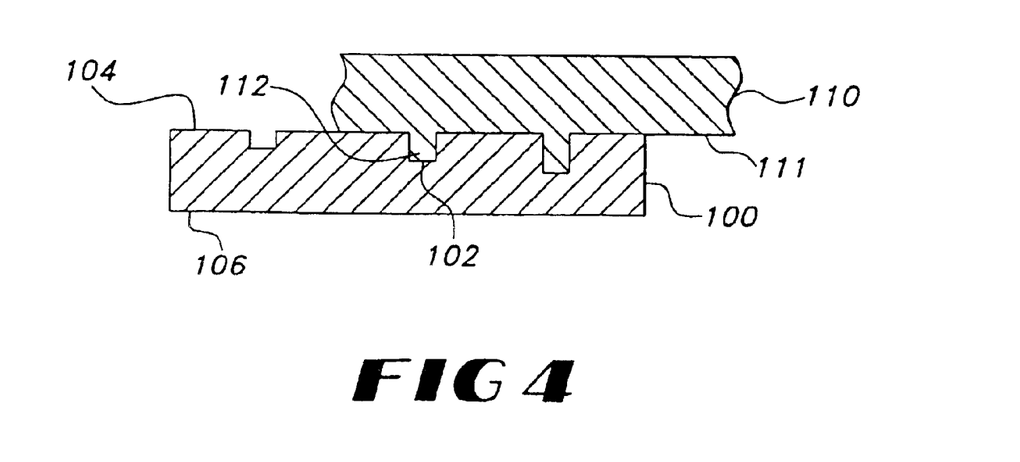
FIG. 4 is a cross-sectional view of the flexible graphite sheet of FIG. 2 having the tool of FIG. 3 texturing the surface of the sheet.

FIG. 4 is a cross-sectional view of flexible graphite sheet 100 with a partial cutaway of the tool 110. As depicted in FIG. 4, the tool 110 is useful for making the holes 102 in the flexible graphite sheet 100. The tool 110 may be pressed onto the outer planar surface 104 wherein the protuberances 112 penetrate interior portions of the flexible graphite sheet 100 to form the holes 102 therein. Moreover, as depicted in FIG. 4, the protuberances 112 may vary in height to provide holes 102 of varying depth.

Figure 5:
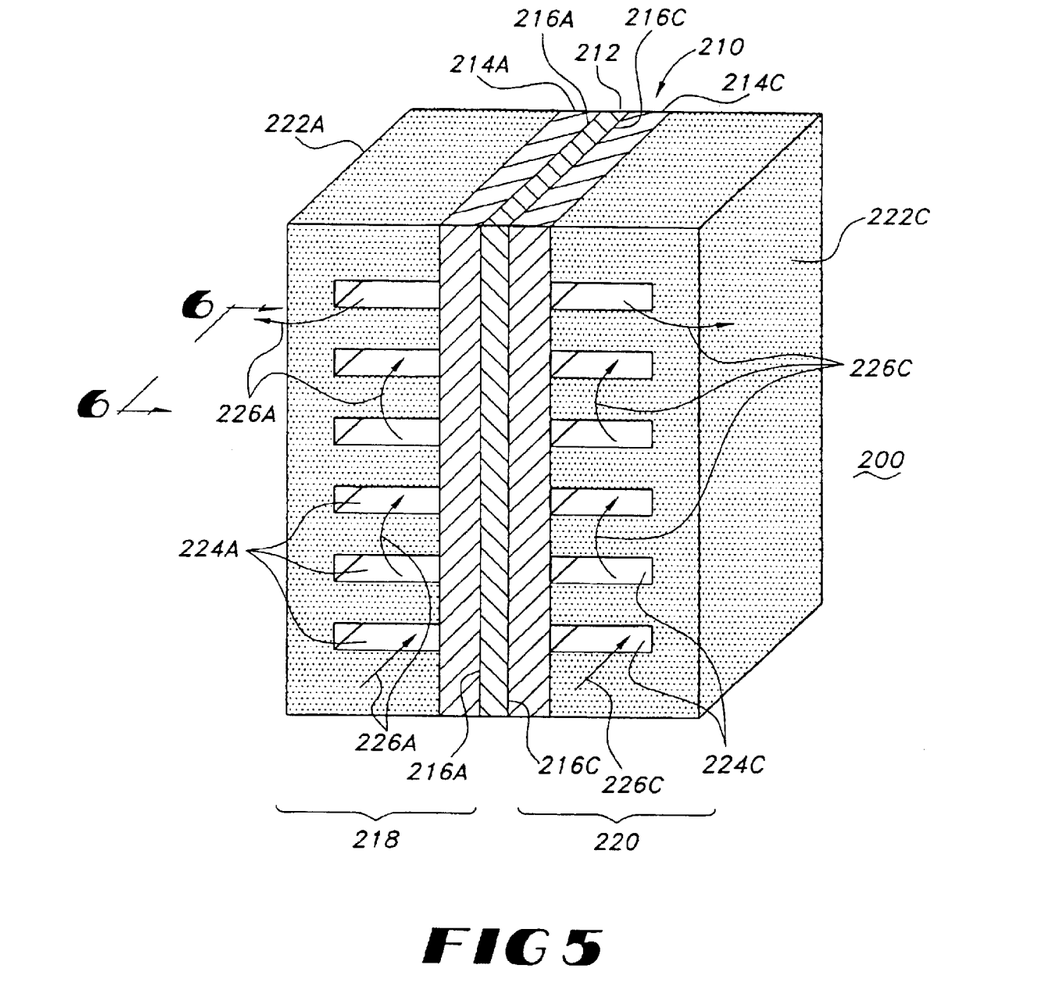
FIG. 5 is a schematic of a fuel cell containing textured graphite sheets of the present invention.

The flexible graphite sheet 100 of the present invention is useful as a fluid-flow field plate for use in a fuel cell. FIG. 5 shows, schematically, the basic elements of an electrochemical fuel cell, such as fuel cell 200. Electrochemical fuel cells convert fuel and oxidant to electricity and reaction product. The fuel cell 200 includes a membrane electrode assembly ("MEA") 210 consisting of a solid polymer electrolyte or ion exchange membrane 212 disposed between two electrodes 214A, 214C formed of porous, electrically conductive sheet material, typically carbon fiber paper. The MEA 210 contains a layer of catalyst (not shown), typically in the form of finely comminuted platinum, at each membrane/electrode interface 216A, 216C to induce the desired electrochemical reaction. The electrodes 214A, 214C are electrically coupled to provide a path for conducting electrons between the electrodes to an external load (not shown).

At anode 218, the fuel permeates the porous electrode material of electrode 214A and reacts at the catalyst layer (not shown) at membrane/electrode interface 216A to form cations, which migrate through the ion exchange membrane 212 to cathode 220. At the cathode 220, oxygen-containing gas reacts at the catalyst layer (not shown) at membrane/electrode interface 216C to form anions. The anions formed at the cathode 220 react with the cations to form a reaction product.

In electrochemical fuel cells employing hydrogen as the fuel and oxygen-containing air (or substantially pure oxygen) as the oxidant, the catalyzed reaction at the anode 218 produces hydrogen cations (protons) from the fuel supply. The ion exchange membrane 212 facilitates the migration of hydrogen ions from the anode 218 to the cathode 220. In addition to conducting hydrogen ions, the ion exchange membrane 212 isolates the hydrogen-containing fuel stream from the oxygen-containing oxidant stream. At the cathode 220, oxygen reacts at the catalyst layer (not shown) at membrane/electrode interface 216C to form anions. The anions formed at the cathode 220 react with the hydrogen ions that have crossed the ion exchange membrane 212 to form liquid water as the reaction product. The anode and cathode reactions in hydrogen/oxygen fuel cells are shown in the following equations:

Anode reaction: $H_2 \rightarrow 2\ H^+ + 2\ e^-$ (IV)

Cathode reaction: $\frac{1}{2}O_2 + 2\ H^+ + 2\ e^- \rightarrow H_2O$ (V)

The MEA 210 is disposed between two electrically conductive plates, such as fluid-flow field plates 222A, 222C, each of which has at least one flow passage 224A, 224C contained therein. These fluid-flow field plates 222A, 222C are typically formed of compressed, exfoliated graphite. The flow passages 224A, 224C direct the fuel and oxidant to the respective electrodes, namely, the anode 218 on the fuel side and the cathode 220 on the oxidant side. In a single cell arrangement, fluid-flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells 200 can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack (not shown), and is usually held together in its assembled state by tie rods and end plates. The stack typically includes manifolds and inlet ports for directing the fuel and the oxidant to the anode and cathode flow field channels.

Figure 6:
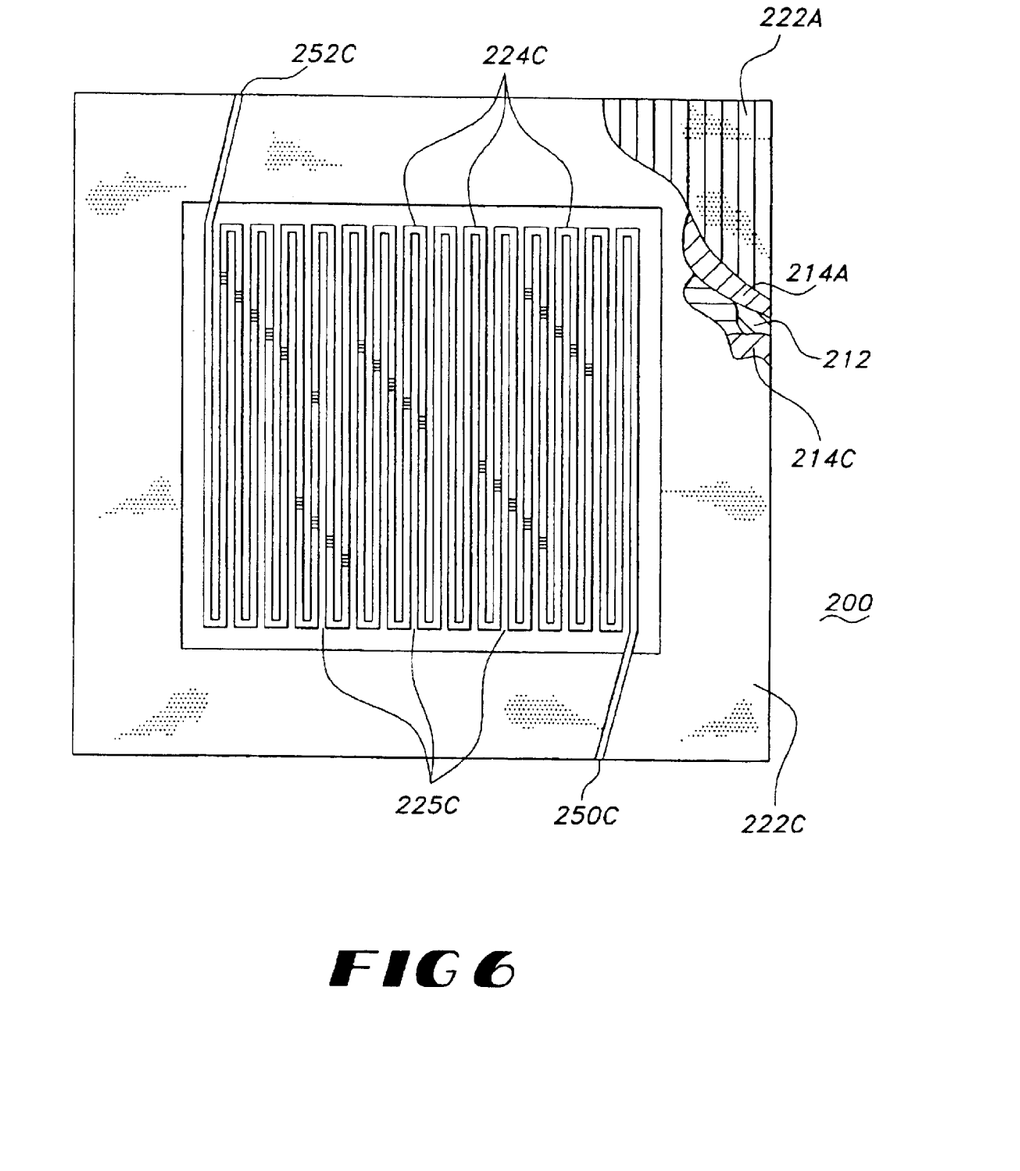
FIG. 6 is a cross-sectional view with a partial cutaway of the fuel cell of FIG. 5 showing a continuous fluid channel for a fluid-flow field plate on a flexible graphite plate.

FIG. 6 is a cross-sectional view of a partial cutaway of the fuel cell 200 taken along the 6—6 axis showing fluid-flow field plate 222C. The fluid-flow field plate 222C includes a single continuous fluid-flow channel 224C which has a fluid inlet 252C and a fluid outlet 250C. Fluid inlet 252C is connected to a source of oxidant (not shown). Continuous flow channel 224C traverses in a plurality of passes a major central area of fluid-flow field plate 222C, which corresponds to the electrocatalytically active region of the cathode 220. Fluid field flow plate 222A has a similarly connected fluid-flow channel 224A, but its fluid inlet is connected to a fuel source.

Figure 7:
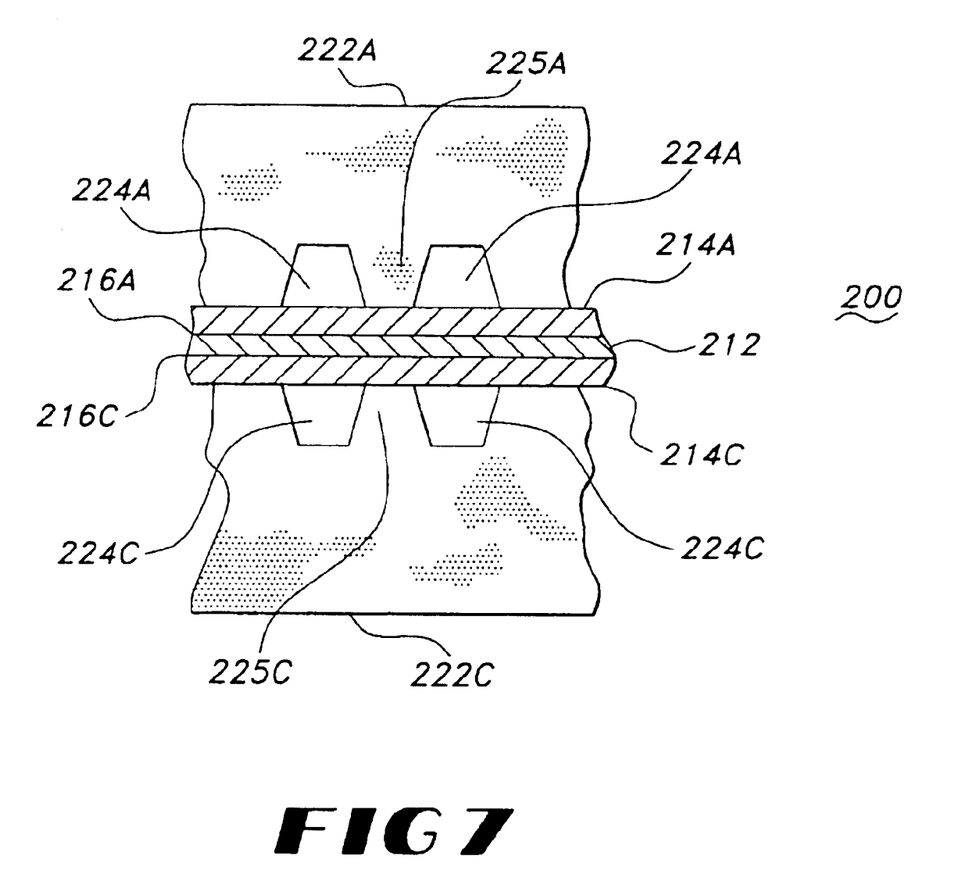
FIG. 7 is a partial cross-sectional view of the continuous fluid channels of the fuel cell of FIG. 5.

FIG. 7 is a partial cross-sectional view of the fuel cell 200, further detailing the fluid-flow channels 224A, 224C. Fluid-flow channels 224A, 224C are separated by walls 225A, 225C, respectively. The fluid-flow channels 224A, 224C are typically 1.5 mm deep and 1–1.5 mm wide and extend to cover the electrode area of the fuel cell 200. The walls 225A, 225C are typically 1–1.5 mm thick. The fluid-flow channels 224A, 224C are formed by a mechanical deformation process, such as stamping, pressing, milling, molding and the like. A compression plate bearing a relief pattern of the fluid-flow channel is useful to impress the pattern in the flexible graphite sheet. The density of the fluid field plates 222A, 222C before mechanical deformation is approximately 0.1 to 0.3 g/cc (5 to 19 lbs/ft³) and after stamping the density typically exceeds 1.1 g/cc (69 lbs/ft³). Fluid field plates 222A, 222C are the flexible graphite sheet 100 of the present invention sealed with a sealant, which is described in further detail below. Holes 102 of flexible graphite plate 100 may be formed before or after the mechanical deformation that forms the fluid-flow channels. The sealant may also be placed into the holes 102 before or after such mechanical deformation. Furthermore, the sealant may be cured before or after such mechanical deformation. Desirably, the holes 102 are formed after such mechanical deformation.

Curable sealants useful with the present invention include any suitable sealant type such as phenolic resins, vinyl resins, silicone resins, acrylic resins, epoxy resins and the like. However, the present invention is particularly useful with (meth)acrylic resins. (Meth)acrylic resins are useful in porosity impregnation applications due to their highly advantageous viscosity characteristics and rapid curability in anaerobic cure and/or heat-curing formulations. Illustrative commercially available impregnation sealing compositions which may be utilized in the practice of the present invention include Resinol® 90C sealant (a registered trademark of Loctite Corporation, Rocky Hill, Conn.), a heat-curable (meth)acrylic resin; and Resinol® RTC sealant (a registered trademark of Loctite Corporation, Rocky Hill, Conn.), an anaerobic sealant composition curable at ambient temperatures in the substantial absence of oxygen. These resins may be accompanied by other conventionally-used composition components, such as polymerization initiators, catalysts, plasticizers and the like.

Desirably, the sealant has a polymerizable component with a majority of polyfunctional (meth)acrylate esters (hereinafter, poly(meth)acrylate esters). These polyfunctional esters produce cross-linked polymers, which serve as effective and durable sealants, adhesives and coatings. While various (meth)acrylate esters may be used, desirable poly(meth)acrylate esters include those with the following general formula:

(VI)

wherein $R_1$ represents a radical selected from the group consisting of hydrogen, lower alkyl of from 1 to about 4 carbon atoms, hydroxyalkyl of from 1 to about 4 carbon atoms and (VII)

$R^2$ is a radical selected from the group consisting of hydrogen, halogen, and lower alkyl of from 1 to about 4 carbon atoms; $R^3$ is a radical selected from the group consisting of hydrogen, hydroxyl, and (VIII)

and m may be 0 to 12, and desirably from 0 to about 6; n is equal to at least 1, e.g., 1 to about 20 or more, and desirably between about 2 to about 6; k is 1 to about 4; and p is 0 or 1.

The polymerizable poly(meth)acrylate esters corresponding to the above general formula are exemplified by, but not restricted to, the following materials: di-, tri- and tetraethyleneglycol dimeihacrylate, dipropyleneglycol dimethacrylate; polyethyleneglycol dimethylacrylate (PEGMA); di(pentamethyleneglycol) dimethacrylate; tetraethyleneglycol diacrylate; tetraethyleneglycol di(chloracrylate); diglycerol diacrylate; diglycerol tetramethacrylate, tetramethylene dimethacrylate; ethylene dimethacrylate; and neopentylglycol diacrylate. Combinations and derivatives of these polyfunctional materials are contemplated.

Monofunctional (meth)acrylate esters (esters containing one (meth)acrylate group) are also useful. The most common of these monofunctional esters include the alkyl esters such as lauryl methacrylate. Many of the lower molecular weight alkyl esters are quite volatile, and frequently it is more desirable to use a higher molecular weight homolog, such as decyl methacrylate or dodecyl methacrylate, or any other fatty acid acrylate esters, in (meth)acrylate-based impregnating compositions.

When monofunctional (meth)acrylate esters are employed in the present invention, it is desirable to use an ester which has a relatively polar alcohol moiety. Such materials are less volatile than low molecular weight alkyl esters and, in addition, the polar group tends to provide intermolecular attraction in the cured polymer, thus producing a more durable seal. Desirably the polar group is selected from the group consisting of labile hydrogen, heterocyclic ring, hydroxy, amino, cyano, and halogen polar groups. Typical examples of compounds within this category are cyclohexylmethacrylate, tetrahydrolurfuryl methacrylate, hydroxyethyl acrylate (HEMA), hydroxypropyl methacrylate (HPMA), t-butylaminoethyl methacrylate, and chloroethylmethacrylate. Combinations of monofunctional (meth) acrylate are contemplated.

The sealants of the present invention may be anaerobically curable through a free-radical mechanism, with an initiator being present therein, or an initiator system comprising a redox polymerization initiator (i.e., an ingredient or a combination of ingredients which produce an oxidation-reduction reaction, resulting in the production of free radicals). Suitable initiators include peroxy materials, e.g., peroxides, hydroperoxides, and peresters, which are capable of inducing polymerization of the sealant compositions in the substantial absence of oxygen, and yet not induce polymerization as long as oxygen is present. Organic hydroperoxides are the desirable peroxy materials with t-butyl hydroperoxide and cumene hydroperoxide being particularly useful with the anaerobic-curing compositions.

In addition to initiator components, sealants useful with the present invention may include various initiator accelerators, as for example hydroperoxide decomposition accelerators, when hydroperoxides are used as cure initiators in the sealant material. Typical examples of potentially suitable accelerators include: tertiary amines such as tributyl amine; sulfimides such as benzoic sulfimide (or saccharin); formamide; and compounds containing transition metals, such as copper octanoate.

The useful sealants may also be heat-curable compositions through a free-radical mechanism, with a heat-cure initiator being present therein, or an initiator system comprising a redox polymerization initiator (i.e., an ingredient or a combination of ingredients which at the desired elevated temperature conditions, e.g., from about 90 to about 150° C. (194 to 302° F.), produce an oxidation-reduction reaction, resulting in the production of free radicals). Suitable initiators may include peroxy materials, e.g., peroxides, hydroperoxides, and peresters, which under appropriate elevated temperature conditions decompose to form peroxy free radicals which are initiatingly effective for the polymerization of the heat-curable compositions.

Another useful class of heat-curing initiators comprises azonitrile compounds which yield free radicals when decomposed by heat. Heat is applied to cure the composition, and the resulting free radicals initiate polymerization of the heat-curable composition.

For example, azonitrile may be a compound of the formula:

(IX)

wherein $R^4$ is a methyl, ethyl, n-propyl, iso-propyl, iso-butyl or n-pentyl radical, and $R^5$ is a methyl, ethyl, n-propyl, iso-propyl, cyclopropyl, carboxy-n-propyl, iso-butyl, cyclobutyl, n-pentyl, neo-pentyl, cyclopentyl, cyclohexyl, phenyl, benzyl, p-chlorbenzyl or p-nitrobenzyl radical or $R^4$ and $R^5$, taken together with the carbon atom to which they are attached, represent a radical of the formula (X)

wherein m is an integer from 3 to 9, or the radical (XI)

Compounds of the above formula are more fully described in U.S. Pat. No. 4,416,921, the disclosure of which hereby is incorporated herein by reference.

Azonitrile initiators of the above-described formula are readily commercially available, e.g., the initiators which are commercially available under the trademark VAZO® from E.I. DuPont de Nemours and Company, Inc. (Wilmington, Del.), including VAZO® 52 ($R^4$=methyl, $R^5$=isobutyl), VAZO® 64 ($R^4$=methyl, $R^5$=methyl), and VAZO® 67 ($R^4$= methyl, $R^5$=ethyl), all such $R^4$ and $R^5$ constituents being identified with reference to the above-described azonitrile general formula.

A desirable azonitrile initiator is 2,2'-azobis(iso-butyronitrile) or AZBN.

The azonitrile may be employed in the inventive heat-curable compositions in concentrations on the order of about 500 to about 10,000 parts per million (ppm) by weight, desirably about 1000 to about 5000 ppm.

Other (meth)acrylic monomer-based impregnating compositions of a heat-curable character may be employed in the broad practice of the present invention, including those disclosed in UK Patent Specifications 1,308,947 and 1,547, 801. As described in these references, the monomeric impregnating composition may contain suitable inhibitors serving to restrict or preclude the occurrence of polymerization of the monomer, at temperatures below those desired or recommended for heat-curing of the impregnating composition.

Figure 8:
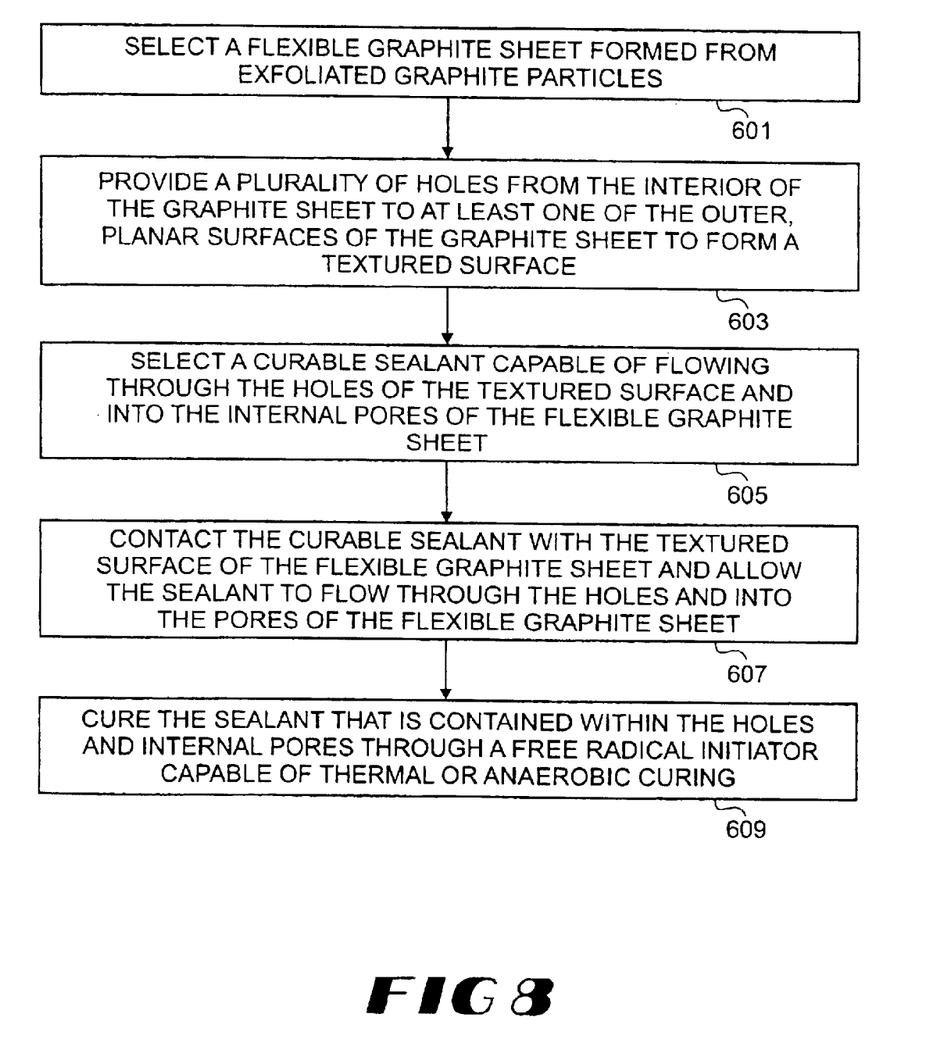
FIG. 8 is a schematic of a method of the present invention for infusing sealant into a flexible graphite sheet.

In another aspect of the present invention, a method to infuse sealant into the internal pores of a flexible graphite sheet is provided. FIG. 8 is a schematic of the present invention.

At step 601, a flexible graphite form, such as a sheet, is selected. The flexible graphite sheet is formed from exfoliated graphite particles by the above-described, well-known methods. Such a flexible graphite sheet is also commercially available under the Grafoil® trade name.

At step 603, at least one of outer planar surfaces of the flexible graphite sheet is textured to provide access in fluid fashion to the internal pores of the exfoliated graphite particles. Providing a plurality of holes from the interior of the flexible graphite sheet to one outer planar surface is useful for texturing a surface of the sheet. Furthermore, other surfaces of a form, such as the opposed, outer planar surface of the sheet, may also be textured with the method of the present invention to provide fluid communication to the internal pores.

The plurality of holes may be provided by any known method, such as drilling, stamping, boring, cutting, milling, pressing and the like. A tool having a plurality of protuberances is useful for forming the holes for the textured surface. The protuberances should be small in diameter to avoid undesired deformation, such as cracks, when pressed on the sheet. A protuberance with a 0.1 mm diameter is useful with the present invention. The present invention, however, is not limited to a 0.1 mm diameter, and other suitable diameters may be used. Furthermore, the force applied to the surface to texture it with hole should be sufficient for the protuberances to penetrate the sheet, but not too great to damage or crack the sheet. The determination of a suitable force for texturing a surface is within the skill of those skilled in the art.

At step 605, a curable sealant, such as the above-described (meth)acrylic sealant is selected.

At step 607, the curable sealant of step 605 is contacted with the textured surface of step 603. Any method suitable for contacting the sealant with the textured surface is useful with the present method. Such contacting methods include, but are not limited to, spraying, immersing, coating and the like. These contact methods may be performed under ambient pressure, reduced pressure or greater-than-ambient pressure conditions.

At step 609, the sealant is desirably cured through a free radical mechanism. Thermal and anaerobic curing are useful with the present invention and are describe above. Sealants may also be cured by ionic mechanisms.

The invention may be further understood with reference to the following non-limiting examples. Percent weights are per the total composition unless otherwise specified.

EXAMPLES

Example 1

Two flexible graphite sheets which were commercially available Grafoil® graphite sheets, had a bulk density of about 0.27 g/cc (16.8 lbs/ft$^3$). The sheets measured about 5 cm by 5 cm with a thickness of about 4 mm.

An outer, planar surface of one of the first sheets was texturized by lightly tapping with a 0.1 mm diameter brass wire brush. A first textured surface with about 0.1 mm diameter holes was obtained. The opposed, outer-planar surface of this first sheet was also texturized in a similar manner to form a second textured surface.

The second sheet was not texturized.

Example 2

A measured amount of Resinol®90C, a heat-curable (meth)acrylic resin commercially available from the Loctite Corporation, was applied dragwise to the first textured surface of the first sheet of Example 1 and was spread uniformly with a cotton applicator. The time of absorption of the heat-curable sealant into the graphite sheet was recorded. The time of absorption was recorded as the loss of a liquid sheen of the sealant. In a similar fashion, the heat-curable sealant was then applied to the second textured surface of the first sheet.

In a similar fashion, both opposed planar sides of the untextured sheet of Example 1 had a measured amount of heat-curable sealant applied to those surfaces. The times to absorption and the amounts of sealant absorbed are summarized below in Table 1.

TABLE 1

|  | Textured Sheet of Example 1 | Untextured Sheet of Example 1 |
| --- | --- | --- |
| Size of Sheet | 5 cm × 5 cm × 4 mm | 5 cm × 5 cm × 4 mm |
| Weight of Sheet | 2.708 g | 2.731 g |
| Weight of Heat-Curable Sealant Applied to First Planar Surface | 0.55 g | 0.54 g |
| Time for Absorption | 6 minutes | 10 minutes |
| Weight of Sealant Applied to Second Planar Surface | 0.583 g | 0.565 g |
| Time for Absorption | 6 minutes, 30 seconds | 16 minutes |
| Total Sealant Applied | 1.133 g | 1.105 g |
| Total Time for Absorption | 12 minutes, 30 seconds | 26 minutes |

The textured graphite sheet proved to have particular efficacy for infusion of the heat-curable sealant into the internal pores of the sheet as noted by the substantial reduction in the time requirements for sealant infusion.

Example 3

A measured amount of Resinol® RTC, an anaerobic curing (meth)acrylic resin commercially available from the Loctite Corporation, is applied, as described in Example 2, to the textured and untextured graphite sheets of Example 1.

Sealant infusion into the textured sheet is substantially quicker than for sealant infusion into the untextured sheet. The amounts of sealant infused to the textured sheet and the untextured sheet is about the same. The textured graphite sheet proves to have particular efficacy for sealant infusion.

Example 4

The sealant-infused graphite sheets of Example 2 are placed in an oven operating at 90 to about 180° C. (194 to 250° F.). After a few minutes or up to an hour, the sealant is fully cured. The curing time depends upon the thickness of the sheet, the amount of sealant take-up, the curing temperature, the amount of heat-curing initiators, the degree of texturing.

Example 5

The sealant-infused graphite sheets of Example 3 are placed between two plates to exclude oxygen from their surfaces. Within 20 minutes, the sealant is fully cured at room temperature. The curing time depends upon the thickness of the sheet, the amount of sealant take-up, the degree of oxygen exclusion, the amount of anaerobic-curing initiators and accelerators, and the degree of texturing.

The invention being thus described, it will be clear to those persons of skill in the art that many variations exist, which are not to be regarded as a departure from the spirit and scope of the invention. All such variations are intended to be within the scope of the claims.

What is claimed is:

1. A method for sealing a graphite sheet having opposed planar surfaces defining an interior portion therebetween, said sheet being formed from exfoliated graphite particles to provide said interior with pores, said method comprising:
   a. providing a plurality of holes extending from said interior of said sheet to at least one of said planar surfaces, wherein said holes are in fluid communication with said pores;
   b. providing a sealant consisting essentially of a curable sealant composition in liquid form;
   c. permitting said curable sealant composition to flow through said holes into said pores; and
   d. curing said curable sealant composition contained within said holes and said pores, such that said holes and said pores are filled substantially with the cured sealant composition to seal said graphite sheet.

2. The method of claim 1 further comprising a tool having a plurality of protuberances for providing said holes by pressing said tool onto said one planar surface.

3. The method of claim 1 wherein selecting said sealant includes selecting a sealant from the group consisting of a phenolic resin, a vinyl resin, a silicone resin, an acrylic resin, an epoxy resin, and combinations thereof.

4. The method of claim 1 further including the step of providing a free radical initiator to initiate cure of said sealant.

5. The method of claim 4 wherein said free radical initiator includes a heat-curing-initiator to produce free radicals by thermal decomposition to cure said sealant.

6. The method of claim 5 wherein said heat-curing initiator is selected from the group consisting of a peroxide, a hydroperoxide, a perester, an azonitrile and combinations thereof.

7. The method of claim 4 wherein said free radical initiator includes an anaerobic-curing initiator to produce free radicals upon the exclusion of oxygen to cure said sealant.

8. The method of claim 7 wherein said anaerobic-curing initiator is a peroxy initiator selected from the group consisting of hydroperoxides, peroxides, peresters and combinations thereof.

9. The method of claim 7 wherein said anaerobic-curing initiator includes an anaerobic accelerator selected from the group consisting of tributyl amine, benzoic sulfimide, formamide, copper octanoate and combinations thereof.

10. The method of claim 1 wherein said selecting said sealant further comprises selecting a curable poly(meth) acrylate ester having the formula:

wherein $R^1$ represents a radical selected from the group consisting of hydrogen, lower alkyl of from 1 to about 4 carbon atoms, hydroxyalkyl of from 1 to about 4 carbon atoms and $R^2$ is a radical selected from the group consisting of hydrogen, halogen, and lower alkyl of from 1 to about 4 carbon atoms; $R^3$ is a radical selected from the group consisting of hydrogen, hydroxyl and m is 0 to about 12, n is equal to at least 1, k is 1 to about 4 and p is 0 or 1.

11. The method of claim 10 wherein said selecting said sealant further comprises selecting a monofuctional acrylate ester, said monofunctional acrylate ester being selected from the group consisting of lauryl methacrylate, cyclohexylmetharylate, tetrahydrofurfuryl methacrylate, hydroxyethyl acrylate, hydroxypropyl methacrylate, t-butylaminoethyl methacrylate, cyanoethylacrylate, chloroethylmethacrylate and combinations thereof.

12. The method of claim 1 wherein said flexible graphite sheet is fluid-flow plate of a fuel cell.

13. The method of claim 12 further including the step of providing a continuous fluid-flow channel in said fluid-flow plate.

14. A graphite sheet comprising:
   a. opposed planar outer surfaces defining an interior portion therebetween, said sheet being formed from exfoliated graphite particles to provide said interior with pores, said sheet having a plurality of holes extending from said interior of said sheet to at least one of said planar surfaces, wherein said holes are in fluid communication with said pores; and
   b. a cured sealant filling said holes and said pores, such that said holes and said pores are filled substantially with said cured sealant to seal said graphite sheet.

15. The graphite sheet of claim 14 wherein said cured sealant composition was formed from a curable sealant composition comprising a resin selected from the group consisting of a phenolic resin, a vinyl resin, a silicone resin, an acrylic resin, an epoxy resin, and combinations thereof.

16. The graphite sheet of claim 15 further including a free radical initiator to initiate cure of said curable sealant composition.

17. The graphite sheet of claim 16 wherein said free radical initiator includes a heat-curing initiator to produce free radicals by thermal decomposition to cure said curable sealant composition.

18. The graphite sheet of claim 17 wherein said heat-curing initiator is selected from the group consisting of a peroxide, a hydroperoxide, a perester, an azonitrile and combinations thereof.

19. The graphite sheet of claim 16 wherein said free radical initiator includes an anaerobic-curing initiator to produce free radicals upon the exclusion of oxygen to cure said curable sealant composition.

20. The graphite sheet of claim 19 wherein said anaerobic-curing initiator is a peroxy initiator selected from the group consisting of hydroperoxides, peroxides, peresters and combinations thereof.

21. The graphite sheet of claim 19 wherein said anaerobic-curing initiator includes an anaerobic accelerator selected from the group consisting of tributyl amine, benzoic sulfimide, formamide, copper octanoate and combinations thereof.

22. The graphite sheet of claim 15 wherein said curable sealant composition further comprises a curable poly(meth)acrylate ester having the formula:

wherein $R^1$ represents a radical selected from the group consisting of hydrogen, lower alkyl of from 1 to about 4 carbon atoms, hydroxyalkyl of from 1 to about 4 carbon atoms and $R^2$ is a radical selected from the group consisting of hydrogen, halogen, and lower alkyl of from 1 to about 4 carbon atoms; $R^3$ is a radical selected from the group consisting of hydrogen, hydroxyl and m is 0 to about 12, n is equal to at least 1, k is 1 to about 4 and p is 0 or 1.

23. The graphite sheet of claim 22 wherein said curable sealant composition further comprises a monofunctional acrylate ester, said monofunctional acrylate ester being selected from the group consisting of lauryl methacrylate, cyclohexylmethacrylate, tetrahydrofurfuryl methacrylate, hydroxyethyl acrylate, hydroxypropyl methacrylate, t-butylaminoethyl methacrylate, cyanoethylacrylate, chloroethylmethacrylate and combinations thereof.

24. The graphite sheet of claim 14 wherein said flexible graphite sheet is fluid-flow plate of a fuel cell.

25. The graphite sheet of claim 24 wherein said fluid-flow plate includes a continuous fluid-flow channel extending through said one planar surface.

* * * * *